United States Patent [19]

Shimizu et al.

[11] Patent Number: 5,489,989
[45] Date of Patent: Feb. 6, 1996

[54] COLOR IMAGE PROCESSING APPARATUS

[75] Inventors: Hideaki Shimizu, Yokohama; Hidenori Ozaki, Kawasaki, both of Japan

[73] Assignee: Canon Kabushiki Kaisha, Tokyo, Japan

[21] Appl. No.: 968,054

[22] Filed: Oct. 28, 1992

[30] Foreign Application Priority Data

Oct. 30, 1991 [JP] Japan .................................... 3-284959

[51] Int. Cl.$^6$ ............................... H04N 1/60; H04N 1/46
[52] U.S. Cl. ......................... 358/401; 358/443; 358/448; 358/522
[58] Field of Search .................................... 358/401, 443, 358/448, 464, 465, 466, 483, 522, 530, 518; 382/162, 167, 168, 232, 254

[56] References Cited

U.S. PATENT DOCUMENTS 4,656,665  4/1987  Pennebaker .
5,068,910  11/1991 Ogura .................................... 358/466 X
5,196,922  3/1993  Yeomans ............................... 358/450 X
5,289,296  2/1994  Yamada .................................... 358/530
5,289,297  2/1994  Bollman et al. .
5,327,158  7/1994  Takahashi et al. .

Primary Examiner—Bentsu Ro
Attorney, Agent, or Firm—Fitzpatrick, Cella, Harper & Scinto

[57] ABSTRACT

An image processing apparatus, capable of secure color judging regardless of the kind of the original image, is disclosed. The apparatus is provided with color judging means for color judgment from input image data, and background color detection means (CPU) for detecting the background color of the image data, and color judging areas of the color judging means are modified according to the hue, luminocity or saturation of the background color detected by said background color detection means.

5 Claims, 15 Drawing Sheets

ORIGINAL PLATE

HISTOGRAM

STANDARD

P IS SMALL $P_R > P_C$

P IS SMALL AND $P_R > P_C$ $P_R < P_C$

COLOR IMAGE PROCESSING APPARATUS

BACKGROUND OF THE INVENTION

1. Field of the Invention

The present invention relates to a color image processing apparatus, with a function for automatically judging color from the entered image data.

2. Related Background Art

In the conventional image reading apparatus with a function of automatic judgment of colors from an image signal generated by a line sensor provided with color separation means such as optical filters, judgment of a particular color is conducted with a fixed threshold value for color judgment (color judging region), as disclosed for example in the U.S. patent application Ser. No. 835,026.

However, in such conventional art, the color judging region may vary for example by a difference in the background color of the original. Such phenomenon has lead to drawbacks that an end of a red image present on a dark background is judged as black, or an end of a black image present on a reddish background is judged as red.

Also such phenomenon has lead, in case of judging a particular color of a color original and replacing thus judged color into a predetermined pattern, to a drawback that the boundary of said pattern becomes not clear.

Also similar drawbacks are encountered in case of image editing such as color conversion.

SUMMARY OF THE INVENTION

An object of the present invention is to resolve the drawbacks mentioned above.

More specifically, the object of the present invention is to provide a color image processing apparatus capable of secure color judgment regardless of the kind of the original.

The above-mentioned object can be attained, according to an embodiment of the present invention, by a color image processing apparatus comprising:

Input means for entering a plurality of color component signals;

detecting means for detecting the background color of an image represented by said color component signals;

judging means for judging the color of a pixel represented by said color component signals in accordance with a predetermined judging standard; and control means for controlling the judging standard in accordance with the background color detected by said detecting means.

Another object of the present invention is to provide a color image processing apparatus capable of achieving satisfactory color reproduction by secure color judgment.

Still another object of the present invention is to provide satisfactory image quality in the formation of a monochromatic image without sacrificing the color information of the color image.

Still another object of the present invention is to effect adaptive color processing, matching the background color of the original.

Still other objects and embodiments of the present invention will become fully apparent from the following description to be taken in conjunction with the attached drawings, and from the appended claims.

DESCRIPTION OF THE PREFERRED EMBODIMENTS

In an embodiment of the present invention to be explained in the following, a part of the original image is read by a reader, then a histogram is prepared from thus obtained data, and the background color of the original image is judged therefrom. A faithful color judgment without the influence of the background color can be achieved by control, according to the luminocity, saturation or hue of thus judged background color of the original, of varying the threshold value for color judgment, for example by lowering the threshold value for black color judgment if the density of the background color is high, or displacing the threshold value for red color judgment toward a side in which the red color is judged less, if the background color or the original is reddish.

For example, images formed with a same red pen on different background colors often give different results in the red color judgment. However, more faithful color judgment is rendered possible by automatically judging the background color and providing accordingly an offset to the threshold value for the red color judgment. Also the aberration in the color judgment resulting from the difference in the light amount of the original illuminating lamp can also be compensated.

Now the present invention will be clarified in detail by preferred embodiments thereof, shown in the attached drawings.

Configuration

Figure 1:
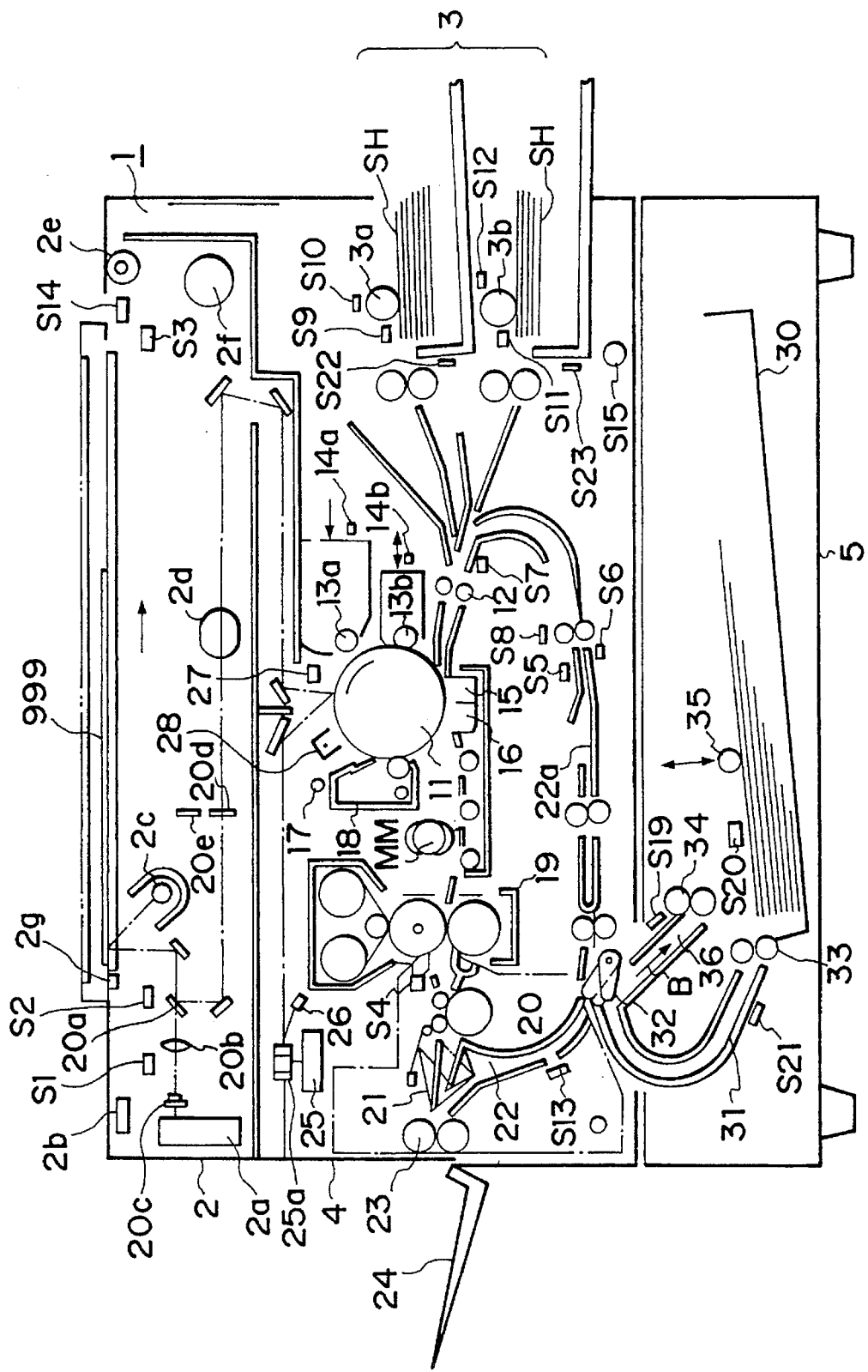
FIG. 1 is a cross-sectional view of an image forming apparatus embodying the present invention.

FIG. 1 is a cross-sectional view of an image forming apparatus constituting an embodiment of the present invention. Said apparatus is composed of a main body 1 of the copying apparatus, an original scanning unit 2, a sheet feeding unit 3, an image recording unit 4, an intermediate tray etc.

At first there will be explained the original scanning unit 2.

A controller unit 2a is composed of a control unit for controlling the entire copying sequence, and an image processing unit for applying an image processing to the image signal read by a CCD line sensor 20c.

There are also provided a power switch 2b, an original exposure lamp 2c, constituting an optical scanning system with a scanning mirror, and effecting a scanning motion with a predetermined speed, and a half mirror 20a. Light transmitted by said half mirror passes through a CCD imaging lens 20b, then subjected to photoelectric conversion by the CCD line sensor 20c and a resulting electrical image signal is supplied to the image processing unit of the above-mentioned controller 2a, as will be explained later in more details. Also light reflected by said half mirror 20a is transmitted by a red filter 20d or a blue filter 20e though neither of said filters is used in certain cases.

An imaging lens 2d is used for focusing the reflected light onto a photosensitive drum 11 of the image recording unit 4, for analog image recording. A buzzer 2e provides an alarm for example in an error in the copying mode set in the operation unit to be explained later. An optical system driving motor (optical system motor) 2f drives the optical scanning system etc. with a high precision.

In the following there will be explained the sheet feeding unit 3.

Sheet feeding rollers 3a, 3b feeds a cut sheet SH into the image forming unit 4.

In the following there will be explained the image recording unit 4.

Registration rollers 12 temporarily stop the cut sheet SH fed by the sheet feeding rollers 3a, 3b, and feed said cut sheet SH again after synchronizing the front end of said sheet with that of the image.

Developing units 13a, 13b contain developers of different colors (red and black) respectively. Either of said developing units 13a, 13b is positioned close to the photosensitive drum 11 which the other is retracted therefrom, by the energization of solenoid 14a, 14b. In case of superposed developments, said solenoid 14a, 14b are controlled by the controller unit 2a.

A transfer charger 15 causes toner images, developed by the above-mentioned developing units 13a, 13b, to be transferred onto the cut sheet SH, and, said image transfer, a separating charger 16 separates the cut sheet SH from the photosensitive drum 11. A pre-exposure lamp 17 neutralizes the surface potential of the photosensitive drum 11, in preparation for the primary charging. A cleaner 18 composed of a cleaning blade and a cleaning roller recovers the toner remaining on the photosensitive drum 11.

A fixing unit 19 fixes, by means of heat and pressure, the toner image transferred onto the cut sheet SH. Transport rollers 20 advances, after said fixed process, the cut sheet SH to a discharge tray 24.

In case of superposed copying, a flapper 21 is moved to a broken-lined position by a solenoid (not shown), and the cut sheet SH after the steps of sheet feeding, image transfer, separation and fixing is forwarded through a transport path 22 to a path 22a. After the sheet is detected by a sensor S5, it is sensed by sensors S6, S8 etc. and is aligned laterally by a lateral alignment solenoid.

Then, in response to an instruction for the superposed copying from the operation unit 41, the cut sheet SH is transported to the registration rollers 12, which are driven by said instruction.

Thereafter the sheet is subjected to the above-explained steps and is discharged to the discharge tray 24.

In case of two-side copying, the cut sheet is discharged to the middle by the discharge rollers 23 as in the ordinary copying operation explained above, but the discharge rollers 23 are reversed after the rear end of the sheet passes the flapper 21, whereby the sheet SH is guided by the flapper 21 and inversely introduced into the transport path 22. The reversed drive is achieved by a solenoid which controls the forward and reverse rotation. The subsequent operations are same as those in the above-explained superposed copying.

As explained in the foregoing, in case of two-side copying, the cut sheet SH is once discharged from the apparatus by the discharge rollers 23, then inverted by the reverse drive of the discharge rollers 23 and forwarded in a direction toward the path 22a.

In the foregoing there have been explained the superposed copying and the two-side copying of a single sheet. The superposed copying or two-side copying on plural sheets is conducted utilizing the intermediate tray unit 5, which is provided with an intermediate tray 30 for temporarily storing the cut sheet SH present on a transport path 31. In case of superposed copying on plural sheets, the cut sheet SH after image fixing is, in a control similar to that in the two-side copying on one sheet, partly discharged by the discharge rollers 23 and is stored in the intermediate tray 30 through the transport path 22, flapper 32 and transport path 36, by the reverse rotation of said discharge rollers 23.

After all the sheets with the copied image on the first face are stored in the intermediate tray 30, the feed rollers 33 are activated by a copying instruction, whereby the copying on the second face is executed through a transport path 36.

On the other hand, in case of two-side copying on plural sheets, under a control similar to that in the superposed copying on a single sheet explained above, the sheets are transported by the flapper 21 from the fixing unit 19 through the transport paths 22, 36 and are stored in the intermediate tray 30.

The subsequent operations are same as those in the superposed copying explained before, and will not, therefore, be explained further.

A scanner motor 25 rotates a polygon mirror 25a with a predetermined speed, thereby deflecting a laser beam emitted from a semiconductor laser 26.

The scanner motor 25, semiconductor laser 26 etc. constitutes a digital scanning unit, which emits a laser beam corresponding to the digital image information entered from the image processing unit of the controller unit 2a, thereby recording said digital image in superposed manner with an image obtained by the above-explained analog image recording. Also in the analog image-recording, said scanning unit may also be utilized for selectively erasing the latent image formed on the photosensitive drum 11 by irradiating said latent image with said laser beam.

There are also shown an exposure shutter 27 for preventing the formation of the latent image, by intercepting all or a part of the reflected image light, and a primary charger 28.

Furthermore there are provided sensors S1–S15, S19–S23. The sensor S1 detects the home position of the optical system constituting the analog scanning unit. In the stand-by state, the optical system stops at said home position. The sensor S2 detects that the optical system has moved to a position corresponding to the front end of the original image, and the timing of copying sequence is controlled by the output of said sensor. Also the sensor S3 detects the limiter position (reversing position) at the maximum scanning. The optical system effects reciprocating motions with a scanning length, corresponding to the cassette size and the magnification instructed from the operation unit.

Figure 2:
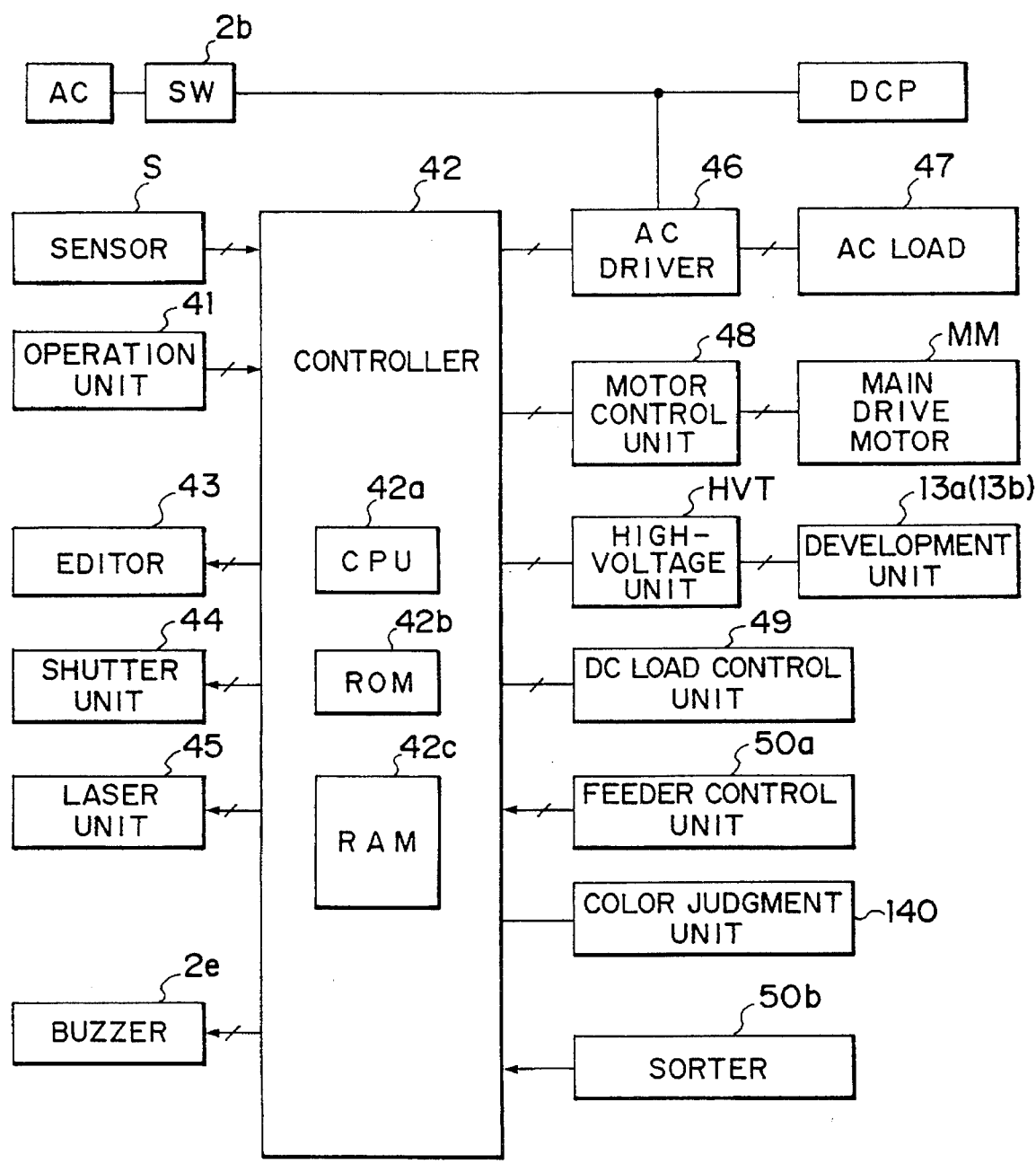
FIG. 2 is a block diagram of a controller unit in FIG. 1.

FIG. 2 is a block diagram showing the structure of the controller unit 2a shown in FIG. 1, wherein same components as those in FIG. 1 are represented by same symbols.

An operation unit 41 is provided with keys for setting the copy modes (one-side, two-side, superposed etc.) and the copying conditions (magnification, sheet size etc.), a first mode setting key for setting a first recording mode in which digital information stored in advance is superposed, by the digital scanning unit, on all the originals fed from an automatic document feeder (ADF), and a second mode setting key for setting a second recording mode in which digital information stored in advance is superposed, by the digital scanning unit, on specified ones among the originals fed by the automatic document feeder.

A controller 42 is composed of a CPU 42a, a ROM 42b, a RAM 42c etc. and collectively controls the copying sequence according to a control program stored in the ROM 42b. An editor 43 is used for entering an area designation in the original image. There are also provided a shutter unit 44 composed of an exposure shutter 27 and a solenoid; a laser unit 45 composed of a semiconductor laser 26, a scanner motor 25 etc.; an AC driver 46 for supplying AC loads 47 such as the original illuminating lamp 2c with an AC power; and a motor control unit 48 for controlling solenoids 14a, 14b, clutches, fans etc.

There are further provided a feeder control unit 50a for controlling the original feeding unit; a sorter 50b for forwarding the cut sheet discharged by the discharge rollers 23 into a designated sorter bin; a high-voltage unit HVT for supplying the charging system and developing sleeves of the developing units 13a, 13b with predetermined high voltages; and a DC power source DCP for supplying the controller unit 2a etc. with a control voltage of +5 V.

Functions

In the following there will be explained the functions of the image processing apparatus of the present embodiment, with reference to the attached drawings.

When the power switch 2b is turned on, the controller 2a energizes a heater in the fixing unit 19, and waits until the fixing rollers reach a predetermined temperature capable of fixing operation (waiting time). When said predetermined time is reached, a main drive motor MM is activated for a predetermined time, thereby driving the photosensitive drum 11, fixing unit 19 etc. in order to obtain uniform temperature distribution on the rollers in the fixing unit 19 (end-waiting rotation). Thereafter the main drive motor MM is deactivated, and the apparatus waits in a copying enabled state (stand-by state). The main drive motor MM is used for driving the photosensitive drum 11, the fixing unit 19, the developing units 13a, 13b and the sheet transporting rollers. The copying sequence is initiated when a copying instruction is entered from the operation unit 41.

In the ordinary image recording, the latent image is formed on the drum 11, without the optical filters 20d, 20e. The laser 26 may be empolyed for erasing a part of the image, by irradiating an arbitrary area of the image with the laser beam. In a mode for erasing reddish colors, the red filter 20d is set in the path of the reflected light from the original, thereby recording the image with the erasure of reddish colors. Similarly the blue filter 20e is set in case of erasing bluish colors.

1st embodiment

In the following there will be explained a first embodiment with automatic red-black separation, in the following order:

(1) Latent image formation of black image
(2) Development of black image
(3) Latent image formation of red image
(4) Development of red image.

(1) Latent image formation of black image

Figure 3:
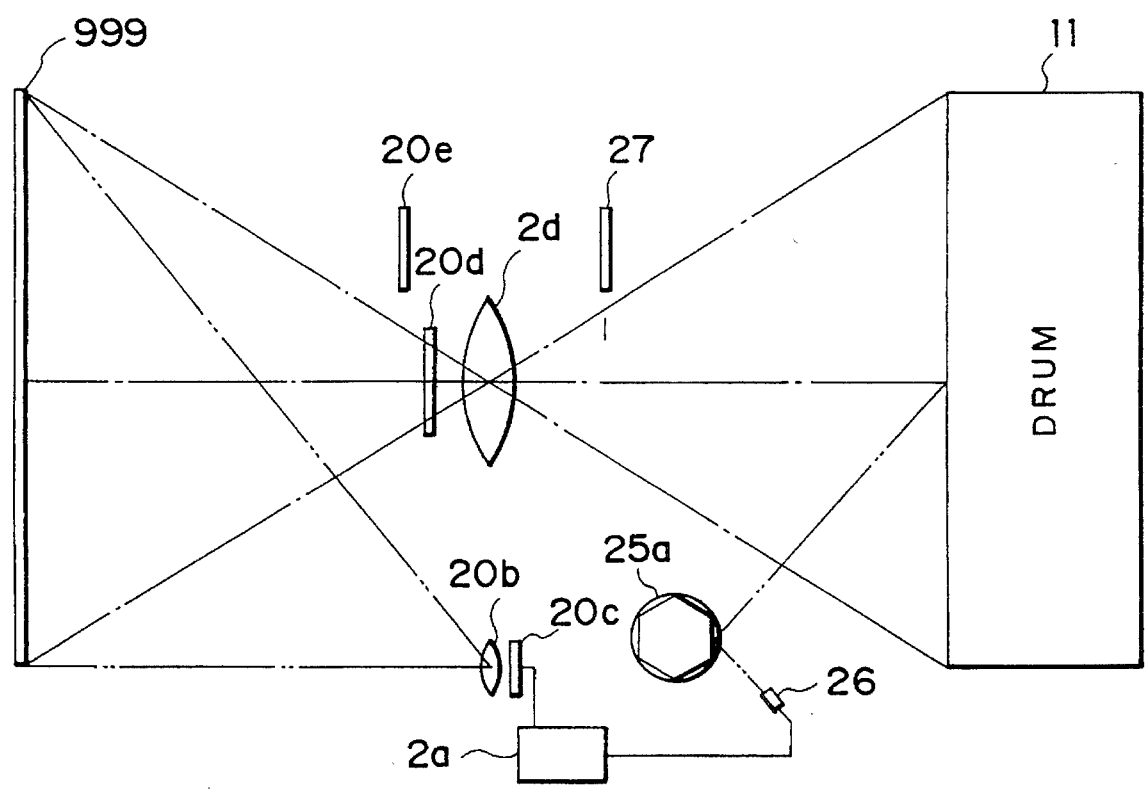
FIG. 3 is a view showing the mode of original scanning.

At first there will be explained the formation of latent image of the black image on the drum 11, with reference to FIGS. 1 and 3.

In preparation for the latent image formation of black image, the red filter 20d is set in front of the imaging lens 2d, for separating the red color. Then the original illuminating lamp 2c and the scanning mirror are moved, by the optical system driving motor 2f, in a direction indicated by an arrow in FIG. 1, whereby the original 999 is scanned by the light of the lamp 2c. The reflected light from said original 999 is reflected by the half mirror 20a, and the red information in said original 999 is erased by the red filter 20d. Said reflected light, from which red information is thus erased, is focused by the imaging lens 2d onto the drum 11.

Thus a latent image, corresponding to the image of the original 999 except for red color, is formed on the drum 11.

(2) Development of black image

The development of the black image will be explained in the following, with reference to FIGS. 1 and 3.

As the cut sheet SH is fed by the feeding rollers 3a, 3b into the image forming unit 4 as shown in FIG. 1, the latent image, excluding the red information, on said drum 11 is developed by the black developing unit 13a, and the obtained image is transferred onto said cut sheet SH. After the image transfer, the cut sheet SH is separated from the drum 11 by means of the separating charger 16. Also the toner remaining on the drum 11 is recovered by the cleaner 16.

After said development and separation, said cut sheet SH is transported to the fixing unit 19, and the black toner image on the sheet SH is fixed by heat and pressure, whereby the black information is recorded. After the recording, the cut sheet SH is transported by the flapper 21 into the path 22, then through the path 22a to the registration rollers 12, and waits until the latent image formation and development of the red image are conducted.

(3) Latent image formation of red image

The latent image formation of red image on the drum 11 is explained in the following with reference to FIGS. 1 and 3.

At first, as a preparation for the latent image formation of red image, the shutter 27 shown in FIG. 1 is closed, thereby intercepting the optical information from the imaging lens 2d. Then the original illuminating lamp 2c and the scanning mirror are moved, by the optical system driving motor 2f, in a direction indicated by an arrow in FIG. 1, whereby the original 999 is scanned by the light from the lamp 2c. The reflected light from said original 999 is transmitted by the half mirror 20a and is focused by the lens 20b onto the CCD line sensor 20c, of which structure will be explained with reference to FIG. 4.

Figure 4:
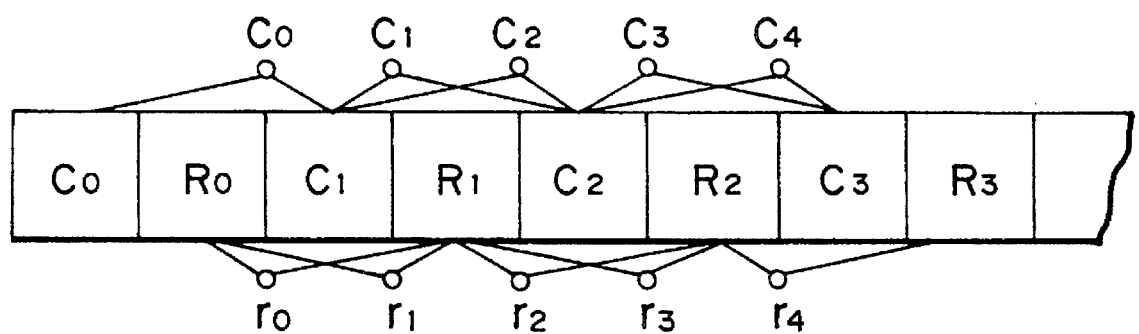
FIG. 4 is a view showing the structure of a CCD sensor.

CCD line sensor (FIG. 4)

As shown in FIG. 4, the CCD line sensor 20c is provided with an alternate arrangement of red optical filters and cyan optical filters. The charges accumulated in said line sensor for a predetermined time are transferred, collectively for all the pixels, to a shift register, and are released in succession therefrom as an image signal, according to shift clock signals CLK.

The image signal from said CCD line sensor 20c is supplied, as an analog electrical signal, to the controller unit 2a. The image processing conducted therein will be explained in the following, with reference to a block diagram shown in FIG. 6.

The image signal (R and C signals) from the CCD line sensor 20c is converted, by an A/D converter 100, into 8-bit digital information, which is supplied to a shading correction circuit 110 for compensating the unevenness in the sensitivity of the CCD line sensor 20c or in the light amount of the original illuminating lamp 2c. The output of said circuit 110 is supplied to an interpolation and pixel matching circuit 120.

Since the red pixels $R_0, R_1, R_2, \ldots$ and the cyan pixels $C_0, C_1, C_2, \ldots$ alternate in the CCD line sensor as shown in FIG. 4, the red signal and the cyan signal have mutually different detecting positions, and there is required a correction for the pixel position. Thus, the circuit 120 determines the red and cyan signals at the boundaries of the red and cyan pixels of the CCD line sensor. More specifically, as shown in FIG. 4, $r_0, r_1, r_2, r_3, \ldots$ are determined from red pixels $R_0, R_1, R_2, \ldots$, and $c_0, c_1, c_2, \ldots$ are determined from cyan pixels $C_0, C_1, C_2, \ldots$ by interpolation. In this manner the number of pixels is doubled by determining the image information of a pixel from linear interpolation of those of two pixels. Therefore, the interpolation and pixel matching circuit 120 not only effects the correction for the pixel position but also doubles the resolving power of the image. Also an MTF can be improved without the error prone to such interpolation.

The method of calculation in said circuit 120 will be explained in the following.

For red signal:

$$r_0 = (\tfrac{3}{4}) \cdot R_0 + (\tfrac{1}{4}) \cdot R_1$$

$$r_1 = (\tfrac{1}{4}) \cdot R_0 + (\tfrac{3}{4}) \cdot R_1$$

$$r_2 = (\tfrac{3}{4}) \cdot R_1 + (\tfrac{1}{4}) \cdot R_2$$

$$r_3 = (\tfrac{1}{4}) \cdot R_1 + (\tfrac{3}{4}) \cdot R_2$$

$$r_4 = (\tfrac{3}{4}) \cdot R_2 + (\tfrac{1}{4}) \cdot R_3$$

For cyan signal:

$$c_0 = (\tfrac{1}{4}) \cdot C_0 + (\tfrac{3}{4}) \cdot C_1$$

$$c_1 = (\tfrac{3}{4}) \cdot C_1 + (\tfrac{1}{4}) \cdot C_2$$

$$c_2 = (\tfrac{1}{4}) \cdot C_1 + (\tfrac{3}{4}) \cdot C_2$$

$$c_3 = (\tfrac{3}{4}) \cdot C_2 + (\tfrac{1}{4}) \cdot C_3$$

$$c_4 = (\tfrac{1}{4}) \cdot C_2 + (\tfrac{3}{4}) \cdot C_3$$

Figure 5:
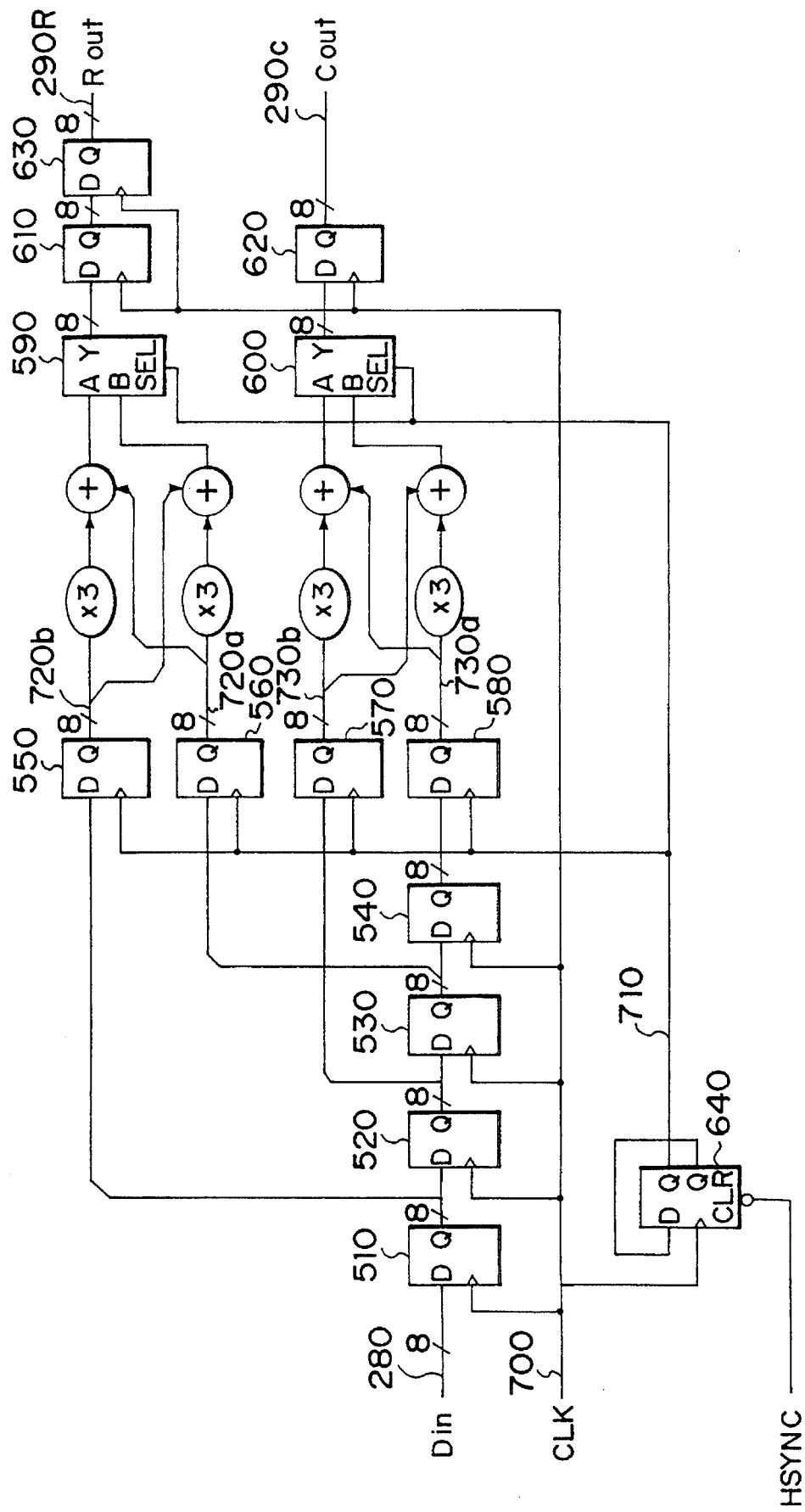
FIG. 5 is a view showing a hardware structure for interpolation and pixel matching.

FIG. 5 shows an example of the hardware structure of the interpolation/pixel matching circuit 120. The 8-bit image signal 280 after the shading correction, consisting of alternate R and C signals, is supplied in synchronization with the clock signals and entered into D-flip-flops 510, 520, 530, 540 in succession, whereby the information of 4 pixels are latched therein.

These image information are supplied to D-flip-flops 550, 560, 570, 580 which are synchronized with a signal 710 obtained by dividing the frequency of the clock signals 700 by a D-flip-flop 640, whereby the red signal of the image information is latched in the D-flip-flops 550, 560 while the cyan signal is latched in the D-flip-flops 570, 580. Then the red image information 720a, 720b latched in the D-flip-flops 550, 560 are subjected to calculations of A=720a+720×3 and B=720a×3+720b, and the obtained results are reduced to ¼ by discarding the lower two bits and supplied to a selector 590. Similarly the cyan image information 730a, 730b are used in calculations and the results are supplied to a selector 600. The selectors 590, 600 alternately select the results A and B in synchronization with the signals 710, and sends the selected results respectively to wave form shading D-flip-flops 610, 620. A D-flip-flop 630 is provided for matching the timing of the R and C signals.

The interpolation and pixel matching are executed in the above-explained manner to obtain a red signal 290R and a cyan signal 290C.

Figure 6:
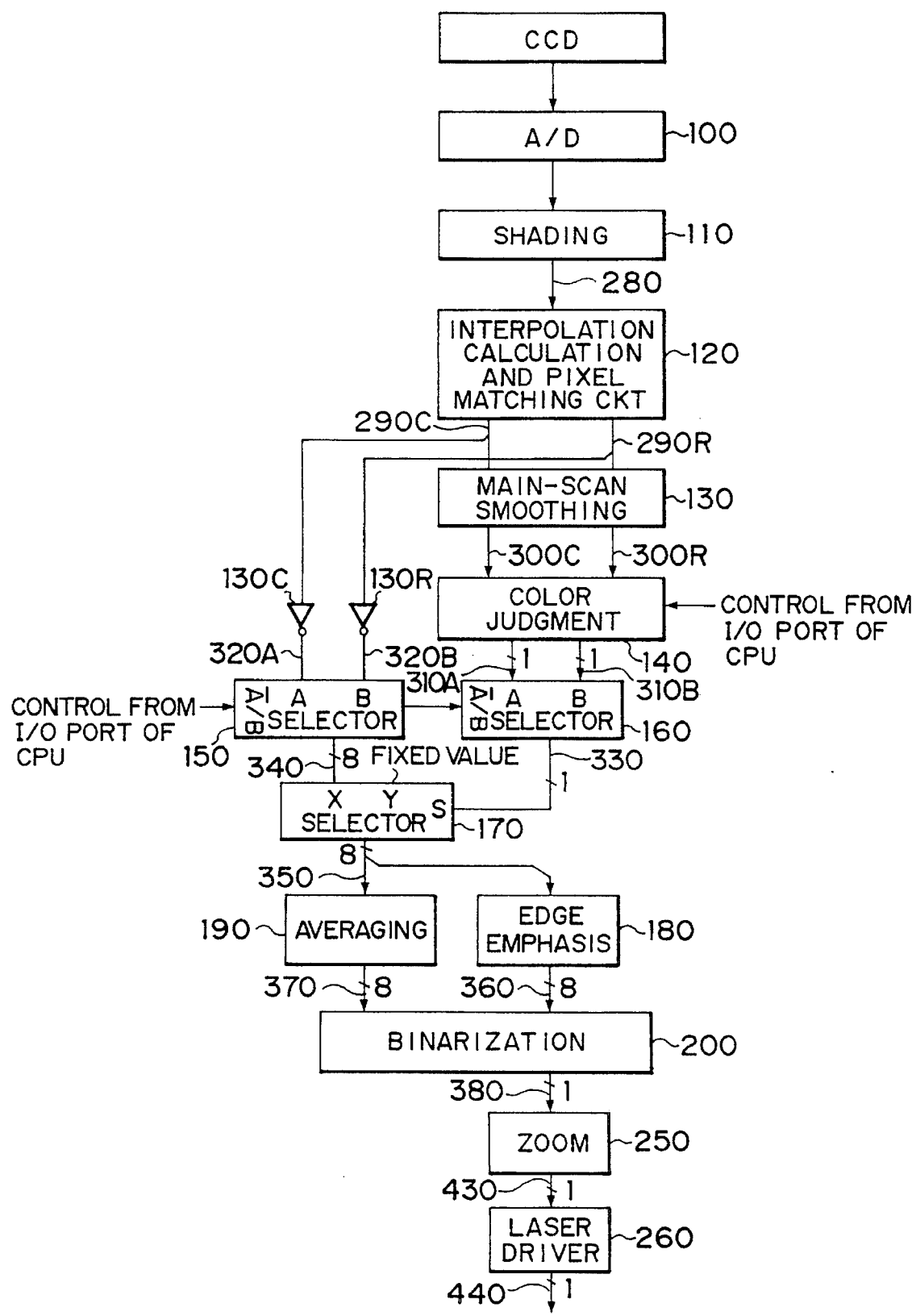
FIG. 6 is a block diagram of an image processing system in a first embodiment.

Said output signals 290R, 290C are supplied to a main scan smoothing circuit 130 and invention circuits 130R, 130C for faithful binarization, both shown in FIG. 6. The main scan smoothing circuit 130 effects a smoothing process on 5 pixels of each of the R signal 290R and the C signal 290C, thus eliminating the noise components of the image information in the main scanning direction, in order to avoid error in the color judgment. Said smoothing is conducted, for the pixels (d, b, a, c, e) arranged in the main scanning direction, by a weighting of (1, 2, 2, 2, 1), so that the value of the target pixel a is given by:

$$a = (d + 2b + 2a + 2c + e)/8$$

Figure 7:
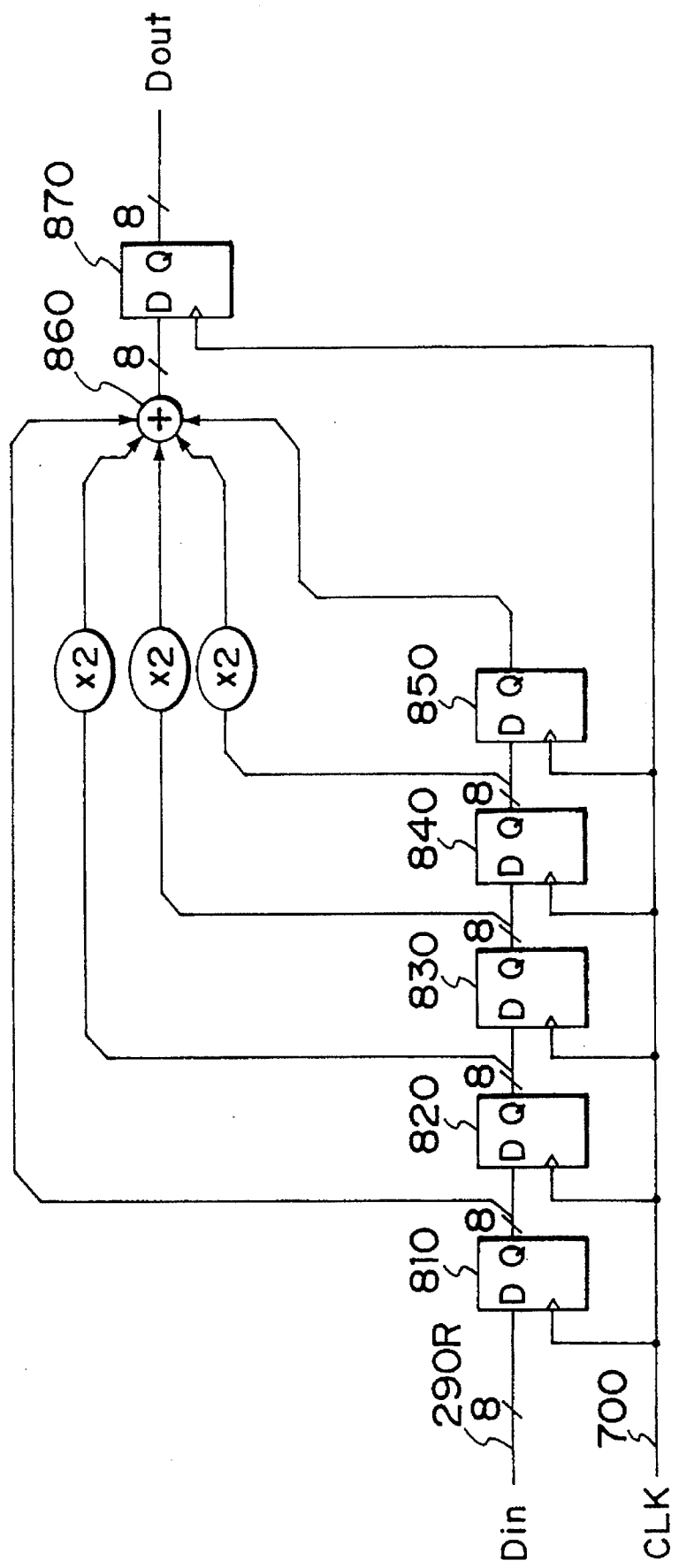
FIG. 7 is a view showing a hardware structure for main scan smoothing.

FIG. 7 shows the hardware structure for the smoothing process in the main scanning direction. As the smoothings for the R and C signals are conducted independently but in the identical manner, there will only be explained the case of the red signal. The output R signal 290R from the interpolation/pixel matching circuit is supplied to the above-mentioned smoothing circuit 130, and entered into D-flip-flops 810, 820, 830, 840, 850 in synchronization with the clock signals 700, whereby the data of 5 pixels are latched.

The latched pixel data are subjected to the weighting of (1, 2, 2, 2, 1) by multipliers and are added by an adder 860, of which output is reduced to ⅛ by discarding the lower three bits. Thus an output signal 300R is released from the adder 860, under the timing control by a D-flip-flop 870. A cyan output signal 300C is also obtained in a similar manner.

In the present embodiment, the smoothing is conducted over 5 pixels with a weighting of (1, 2, 2, 2, 1), the number of pixels and weights of the smoothing are not limited to such embodiment. Since the noise components are dependent for example on the kind of the sensor, the number of pixels and the weights may be suitably selected according to the kind of the sensor.

As shown in FIG. 6, the output signals 300R, 300C of the main scan smoothing are supplied to a color judging circuit 140, which generates color judgment signals 310A, 310B, 310B based on the red digital information 300R (8 bits; 256 levels) and the blue digital information 300C (8 bits; 256 levels). The mode of color judgment in said judging circuit 140 is shown in FIGS. 8 and 9.

Figure 8:
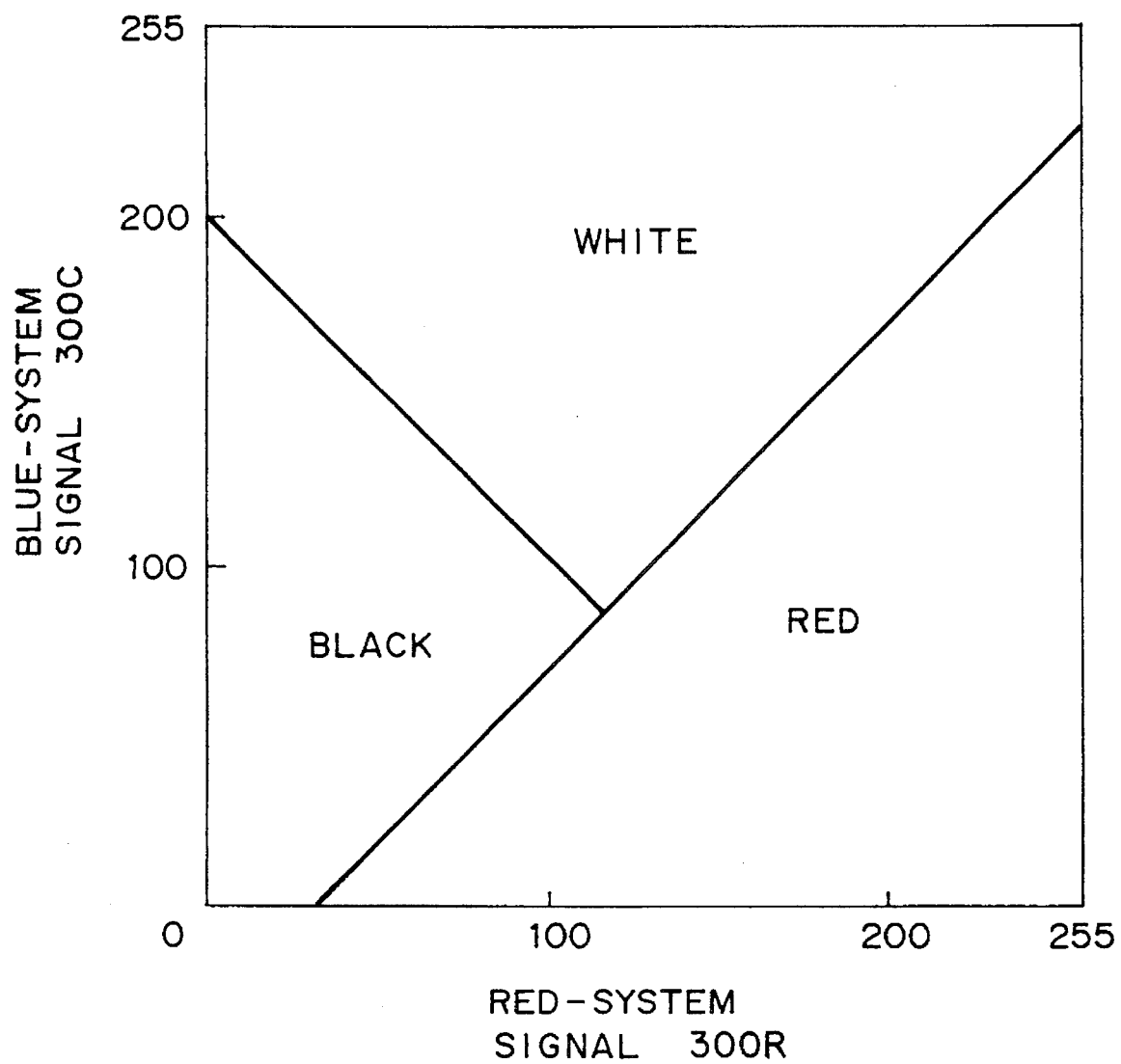
FIGS. 8 and 9 are charts showing the principle of color judgment in the first embodiment.
Figure 9:
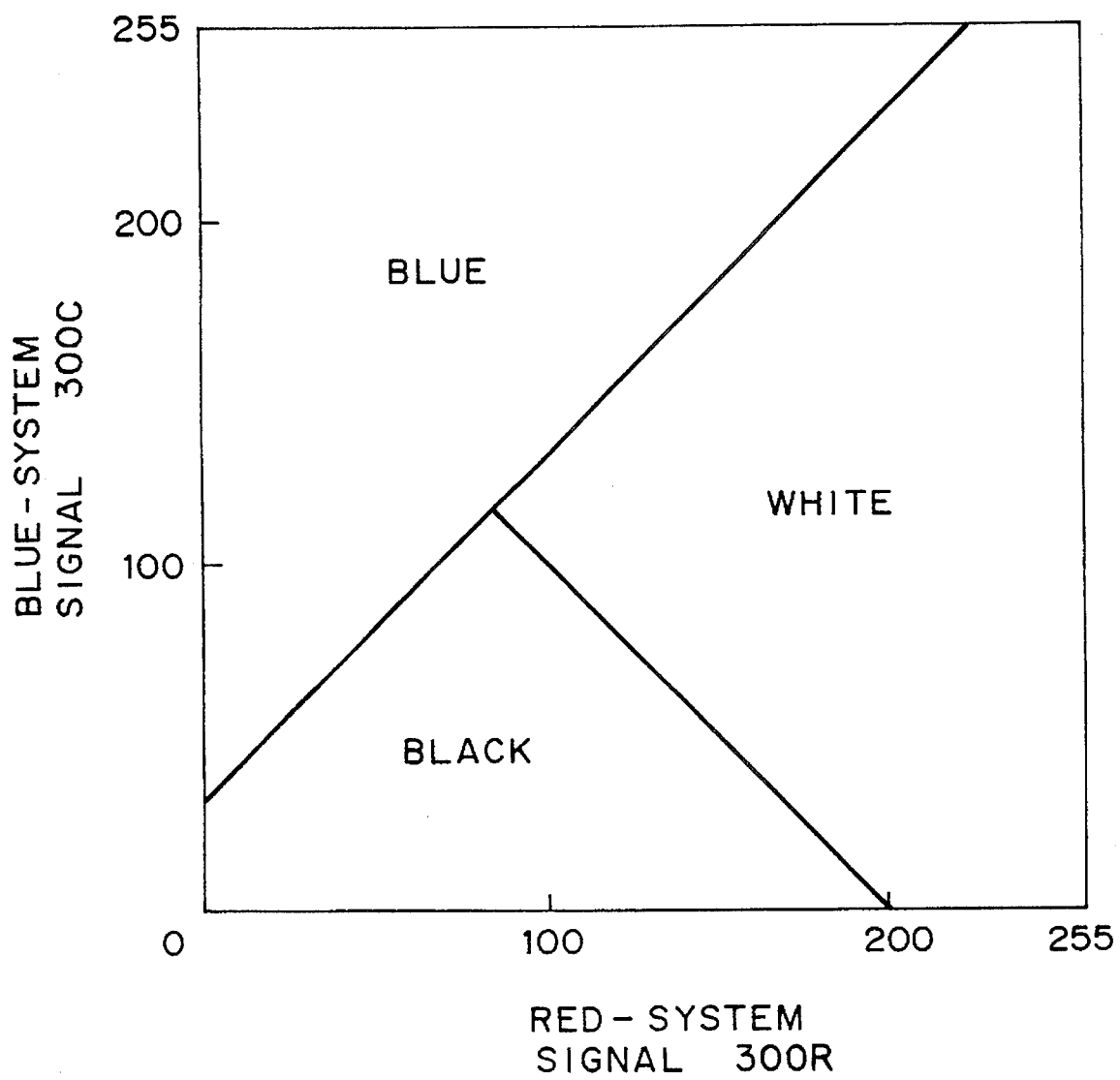
Figure 10:
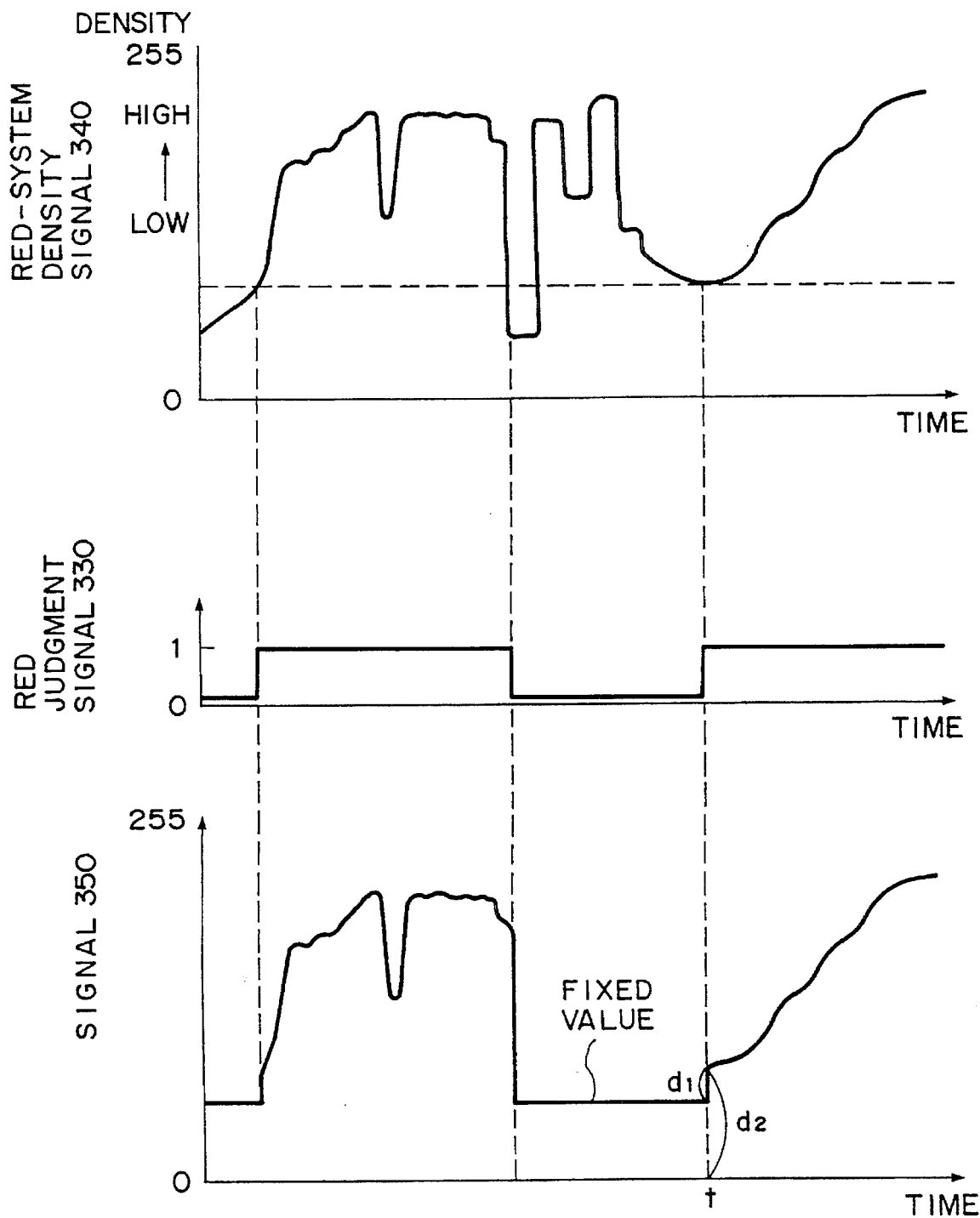
FIG. 10 is a chart showing the selection of a density signal.

FIG. 8 shows a table for generating a red judgment signal 310A and a black judgment signal 310C, while FIG. 9 shows a table for generating a blue judgment signal 310B and black judgment signal 310C. Both tables can be composed for example of look-up tables formed by RAM's or of calculating circuits. As an example, values of the red signal 300R of "200" and the blue signal 300C of "100" belong to the red area in FIG. 8, so that the red judgment signal 310A assumes a value "1". Also in FIG. 9, said values belong to the white area, so that the blue judgment signal 310B assumes a value "0".

The look-up table shown in FIG. 8 is used for judging red and black in case of red-black print while that in FIG. 9 is used for judging blue and black in case of blue-black print, but the content of table, particularly the determination of boundaries, is not limited to those shown in FIGS. 8 and 9.

More specifically, for example in FIG. 8, if the red area is expanded, the range of hues judged as red is also increased. Consequently, even for the purpose of red and black judgment, there may be provided plural tables of different boundary positions according to the table of the user.

Then the red signal 290R and the blue signal 290C are inverted respectively by inversion circuits 130R, 130C into signals 320B, 320A. Said signal 320B is a cyan density signal, as it is obtained by inverting the red luminance signal 300R. Also the signal 320A is a red density signal, as it is obtained by inverting the blue luminance signal 300C. As shown in FIG. 6, said density signals 320A, 320B are based on the data not processed in the main scan smoothing circuit 130, in order to achieve faithful binarization.

Selectors 150, 160 shown in FIG. 6 are controlled by the aforementioned I/O port (not shown) of the CPU 2a, and the control line for said selectors assumes a value "0" or "1" respectively in case of separation of red colors or blue colors.

Thus, in case the separation of reddish colors is selected, the signal 310A is selected as a signal 330, while the signal 320A is selected as a signal 340.

In the following there will be explained a case of separation of reddish colors, in which the control lines for the selectors 150, 160 are of the level "0".

The red density signal 340 selected by the above-mentioned selector 150 is supplied to a terminal x of a selector 170, of which terminal y receives a fixed value ("32" in the present embodiment). Also the red area signal 330 is supplied to a control terminal S of the selector 170, which releases the red density signal 330 or the fixed value 340 respectively if the signal supplied to the control terminal S is "1" or "0".

The output signal 350 from the selector 170 is supplied to an edge enhancement circuit 180 and an averaging circuit 190.

Said edge enhancement circuit 180 is composed of a known edge enhancing filter for enhancing the edge portion of the input signal 350, while the averaging circuit 190 effects the averaging of the input signal 350 in a 9×9 matrix around the object pixel. Output signals 360, 370 from said edge enhancement circuit 180 and averaging circuit 190 are supplied to a binarizing circuit 200, which compares the 8-bit output signal 360 of the edge enhancement circuit 180 with the 8-bit output signal of the averaging circuit 190 and releases a 1-bit red signal 380.

The size of the filter for said edge enhancement and smoothing is naturally not limited to the above-explained example.

As the binarization is conducted on the image after edge enhancement, employing the average value as the threshold value, there can be achieved more faithful binarization, and a binary image signal 380 is obtained in this manner.

The output signal 400 from said binarization circuit 200 is supplied to a magnification change circuit 250, which effects a change in the magnification according to the instruction from the operation unit 41. The output signal 430 of said circuit 250 is supplied to a next laser driver circuit 260 and used for driving the laser 26. Said laser 26 converts the electrical signal from the laser driver circuit 260 into optical information, which is reflected by the rotary polygon mirror 25a and forms a latent image of the red information on the drum 11.

(4) Development of red image

The red latent image thus obtained is developed as will be explained in the following with reference to FIGS. 1 and 3.

The latent image of the red information, formed by the laser 26 on the drum 11, is developed by the red developing unit 13b. The cut sheet SH which was transported to the registration rollers 12 after the black image development is transported again simultaneously with the start of red image development, and is subjected to the transfer of the red image on the drum 11. After said image transfer, the cut sheet is separated from the drum 11 by the separating charger 16, and is transported to the fixing unit 19, which fixes the red toner image on the cut sheet SH by means of heat and pressure.

The cut sheet SH bearing the black and red recorded information is discharged by the flapper 21 onto the discharge tray 24.

Figure 11:
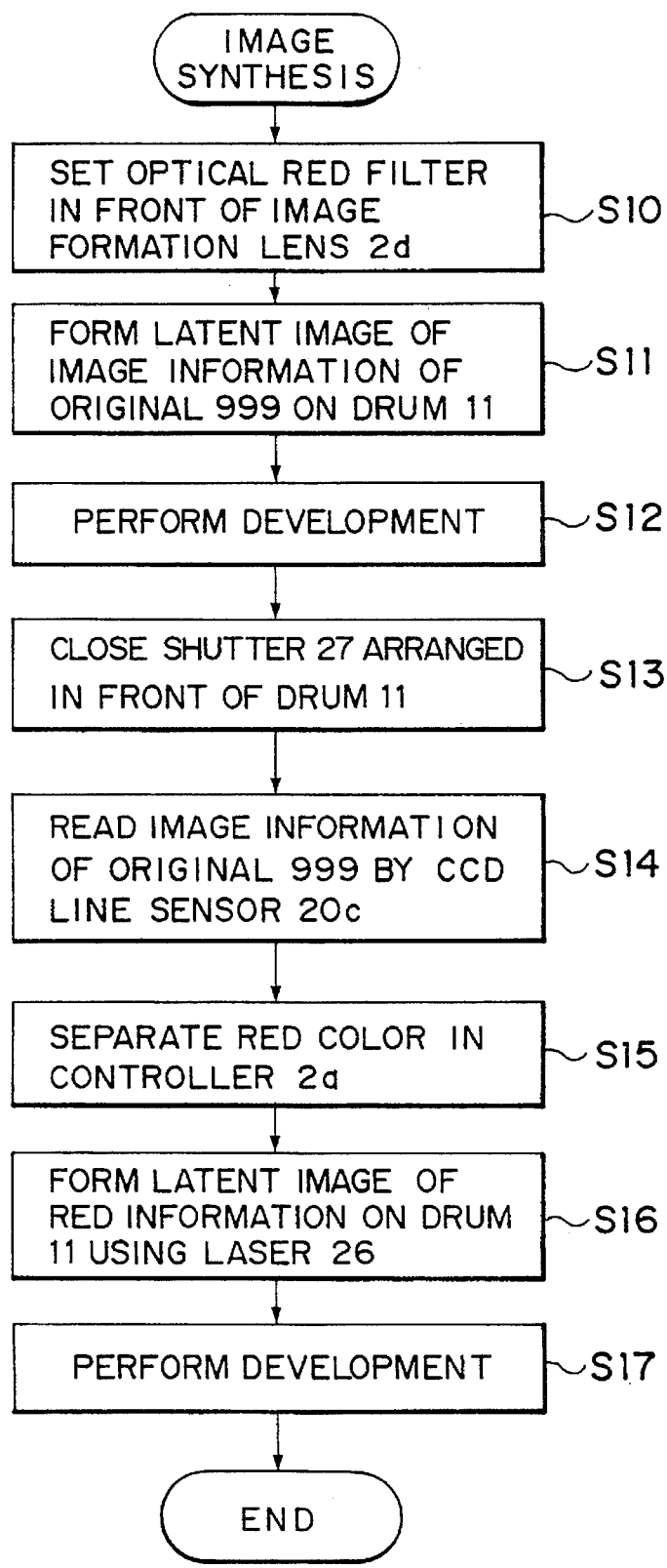
FIG. 11 is a flow chart of image synthesis in an embodiment.

FIG. 11 is a flow chart showing an example of the image synthesizing sequence in the apparatus of the present invention.

For erasing the red analog image in the original 999 (for separating the red analog image from the black image in the original 999), the optical filter 20d is set in front of the imaging lens 2d (step S10). Then the original 999 is illuminated by the original illuminating lamp 2c, and the reflected light is guided to said optical filter 20d, whereby the remaining image information after elimination of the red image information is passed through the imaging lens 2d and is focused on the photosensitive drum 11 to form a latent image corresponding to the image excluding said red image (step S11). Then said latent image, excluding the red image, is developed into black color by the developing unit 13a (step S12). The developed black image is transferred onto a transported cut sheet SH according to the known electrophotographic process, then the cut sheet SH is separated by the separating charger 16, and the toner image is fixed by heat and pressure in the fixing unit 19.

The cut sheet SH bearing thus formed black image is transported under the control of the flapper 21 through the paths 22, 22a to the position of the registration rollers 12. Then, in preparation for the next red image recording (digital image recording), the exposure shutter 27 provided in front of the drum 11 is closed (step S13), whereby the optical information from the imaging lens 2d no longer reaches the drum 11.

Then the original 999 is illuminated by the original illuminating lamp 2c, and the reflected light is transmitted by the half mirror 20a and is focused on the line sensor 20c (step S14). The electrical signal, obtained by the photoelectric conversion in the line sensor 20c, is supplied to the controller 2c for effecting the red color separation (step S15), and the separated red image information is supplied to the laser driver 260 for modulating the semiconductor laser 26 constituting the digital image recording system, and the scanning operation is executed by the polygon mirror 25a to form a latent image corresponding to the red color, on the photosensitive drum 11 (step S16). Said latent image is developed into red color by the developing unit 13a (step S17), and the obtained image is transferred onto the re-fed cut sheet SH. The cut sheet SH after said image transfer is separated by the separating charger 16, and is subjected to the image fixation in the fixing unit 19.

The cut sheet SH, bearing thus synthesized information of black and red colors, is discharged by the flapper 21 onto the discharge tray 24.

In general, by rendering selectable the filter for color separation corresponding to the color of developer set in the developing unit 13a, it is possible to synthesize a digital image of said color with an analog image.

More specifically, in addition to two-color print of black and red, a two-color print of black and blue can be obtained in a similar manner. It is furthermore possible to obtain a three-color print of black, red and blue or a multi-color print including additional colors of development.

As explained in the foregoing, the first embodiment enables two-color copying of black and red by multiple developments.

Figure 12:
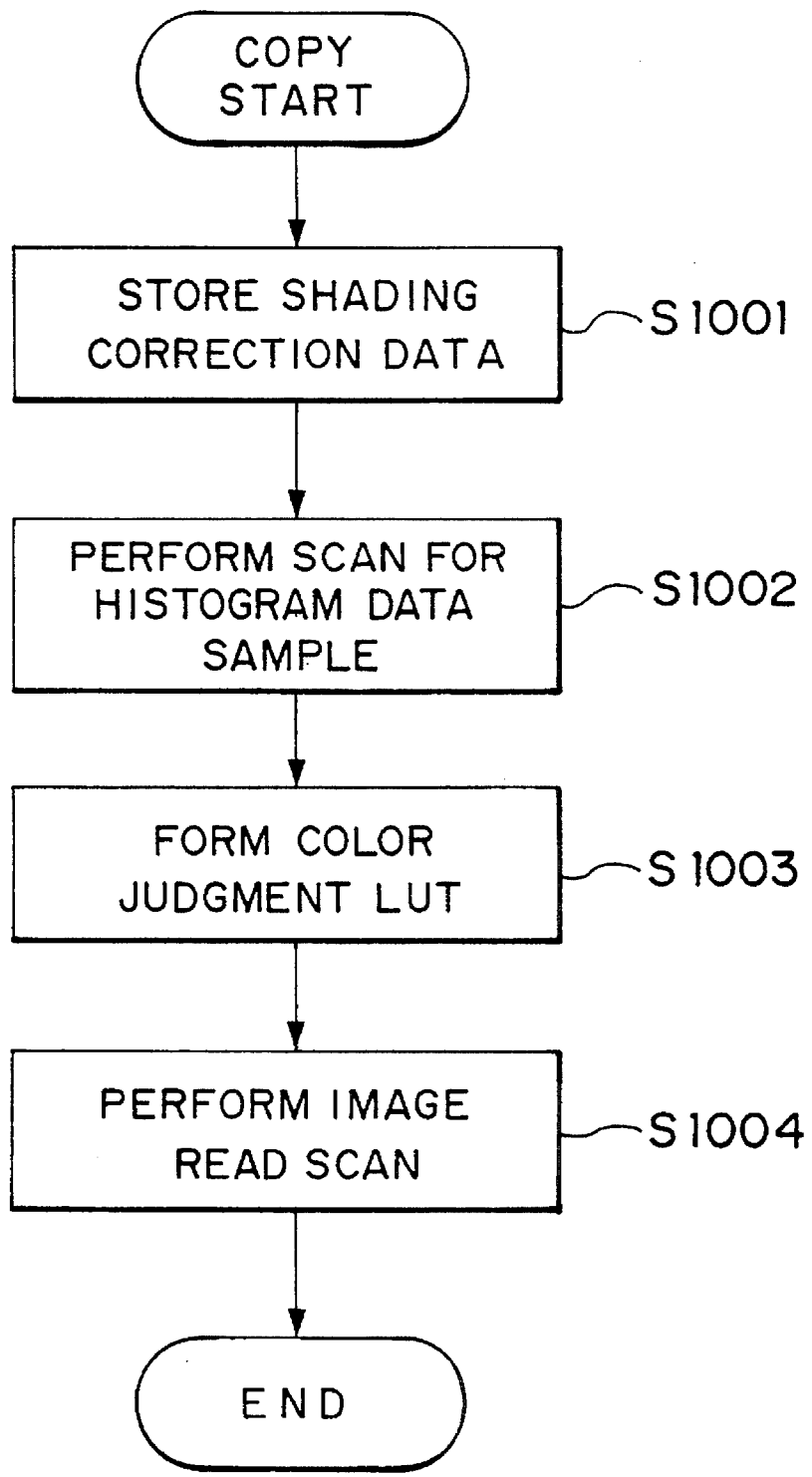
FIG. 12 is a flow chart of formation of a look-up table for color judgment.

Now reference is made to FIG. 12 for explaining the automatic color judgment process.

Figure 13:
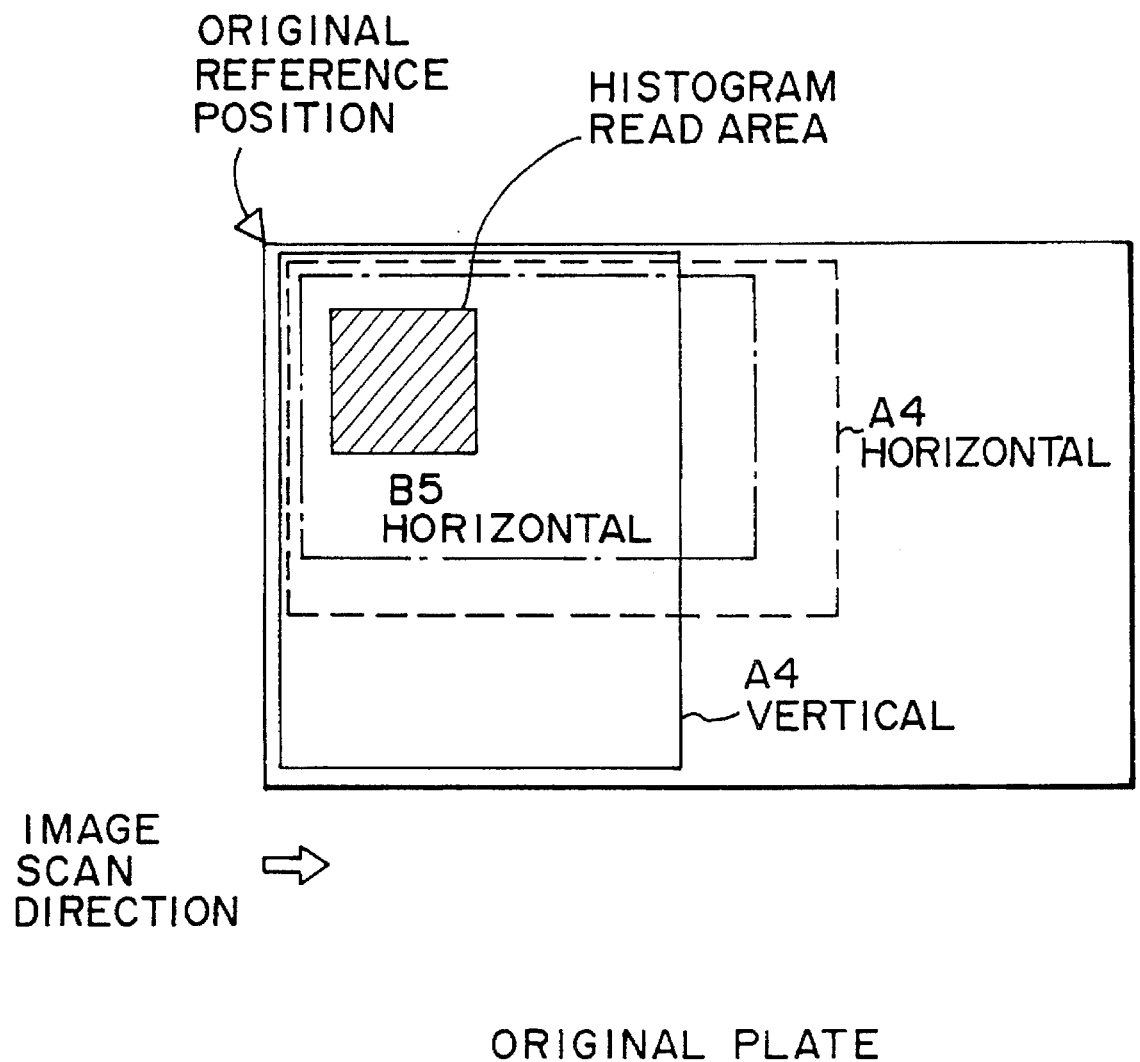
FIG. 13 is a view showing a histogram preparation area.
Figure 14:
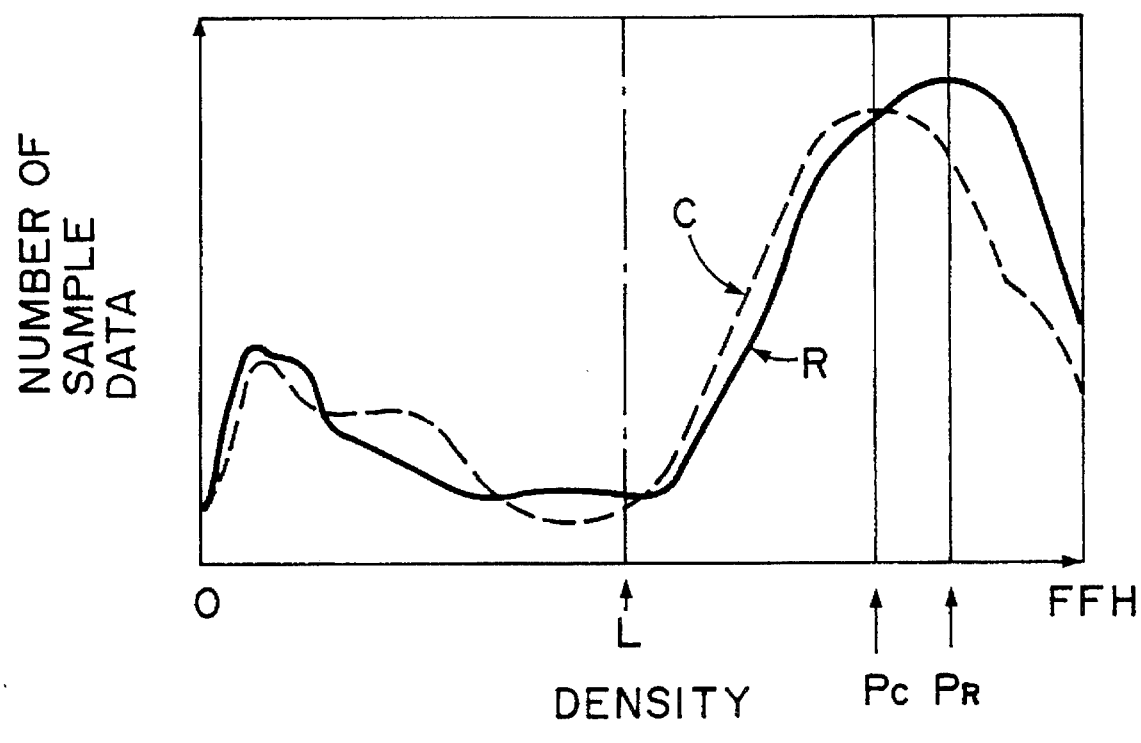
FIG. 14 is a view showing an example of histogram formation.
Figure 15A:
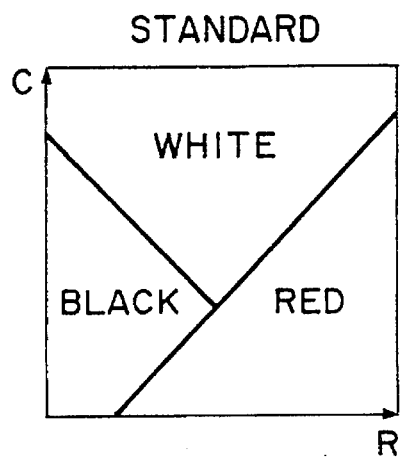
FIGS. 15A to 15E are charts showing variation in the color judging look-up table.
Figure 15B:
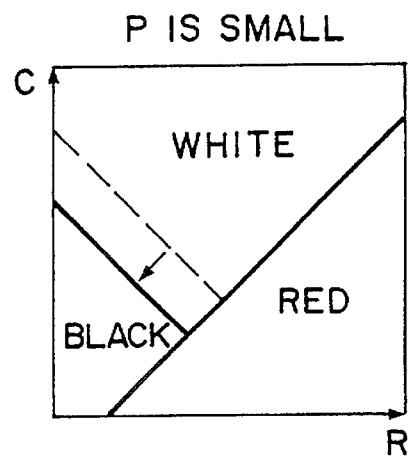
Figure 15C:
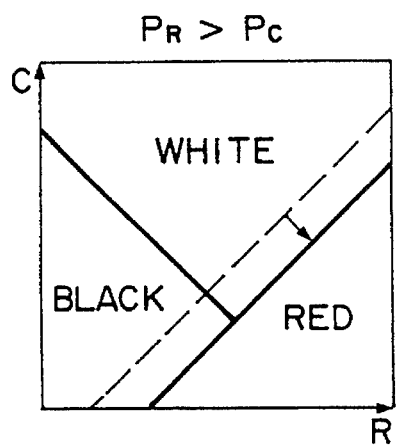
Figure 15D:
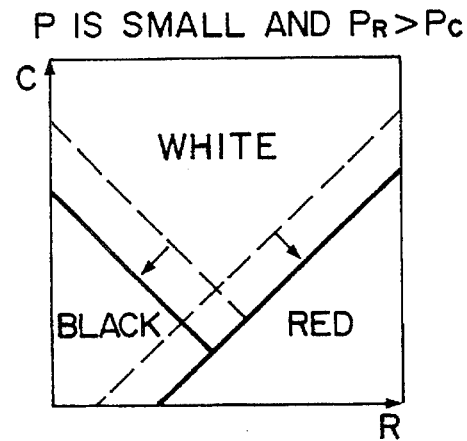
Figure 15E:
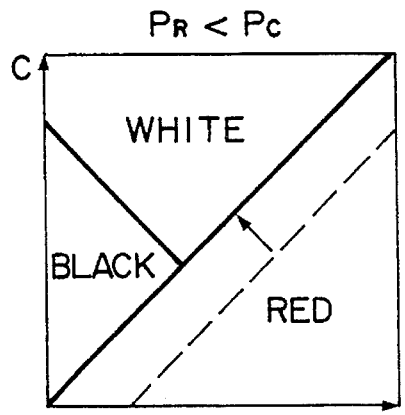

At first, when a copy start key of the operation unit 41 is actuated, the original scanning system composed of the original illuminating lamp 2c etc. illuminates the white board 2g at the home position, and there are memorized shading correction data, based on the signal from the line sensor 20c (step S1001). Then a part of the image of the original is read in a pre-scan, and a histogram is prepared in the RAM 42c of the controller 42, based on thus obtained image data, after shading correction utilizing the above-mentioned shading correction data (step S1002). FIG. 13 shows the histogram reading area, from which the sample image data for said histogram are fetched at a predetermined interval of pixels. When said data fetching is completed, the scanning operation is also completed and the scanning system returns to the home position. In the above-explained example the image data are fetched from a two-dimensional area, but the data may also be sampled from a specified area in a one-dimensional line. FIG. 14 shows an example of the histogram prepared from thus sampled data. Thus, the distribution of the number of data for each density value is prepared, for each of the output signals of two-color sensor (R, C), on the RAM, and the highest peaks $P_R$, $P_C$ are searched from the FFH side. If the peak is not present in the density range higher than L, there should be an error such as the non-lighted state of the lamp, and an error display is provided and the process is stopped.

The values $P_C$, $P_R$ determined from said histograms are considered to indicate the background color of the original. Thus, the background color is detected by the CPU 42a, and the color areas of the look-up table (LUT) for color judgment are modified according to said values $P_C$, $P_R$. If the LUT in the color judging circuit 140 is composed of a RAM, the CPU 42a of the controller 42 rewrites the data of said RAM in the following manner. Also if the LUT is composed of a calculating circuit, the CPU rewrites the coefficients for calculation.

The modification of the LUT is conducted in the following manner. In case of judging red, black and white as shown in FIG. 15, and if a state $P_C = P_R = $ FFH is taken as standard (a), the slice level for judging black is lowered as $P_C$, $P_R$ become smaller with respect to FFH. In case $P_R > P_C$, the slice level for judging red is elevated in the vector direction R-C (c). If $P_C < P_R$, said slice level is lowered in the vector direction R-C (d). Also, if $P_C$ and $P_R$ are small and satisfies a relation $P_R > P_C$, the LUT is formed as shown in (d) (step S1003). Thereafter the image reading scan (main scan) is conducted (step S1004) with the color judgment at the same time, and a predetermined mode for image formation is executed.

This configuration can similarly modulate the ranges of color judgment, also based on the image data with three colors (R, G, B). Thus the foregoing embodiment explains the case of detecting red or blue, but the present invention is also effecting for judging three or more colors. Also in this case, if the background is for example reddish, the threshold value is varied in a direction so as not to erroneously judge the red background color as in the foregoing explanation.

Also, the foregoing embodiment utilizes the pre-scan and the main scan because of the absence of a frame memory for storing the image data of a frame, but the pre-scan can be dispensed with by plural read-outs from the frame memory if such memory is provided.

As explained in the foregoing, the present invention enables secure color judgment regardless of the kind of the original.

The present invention is not limited to the foregoing embodiment but is subjected to various modifications and applications, within the scope and spirit of the appended claims.

What is claimed is:

1. A color image processing apparatus comprising:

input means for entering a plurality of color component signals;

detecting means for detecting a background color of an image represented by said plurality of color component signals;

judging means for judging a color of a pixel represented by said plurality of color component signals in accordance with a predetermined judging standard defined by a function comprising a plurality of color parameters; and control means for controlling the predetermined judging standard in accordance with the background color detected by said detecting means.

2. A color image processing apparatus comprising:

input means for entering a plurality of color component signals;

detecting means for detecting a background color of an image represented by said plurality of color component signals;

judging means for judging a color of a pixel represented by said plurality of color component signals in accordance with a predetermined judging standard; and control means for controlling the predetermined judging standard in accordance with the background color detected by said detecting means;

wherein said detecting means is adapted to detect the background color by preparing a histogram, based on the plurality of color component signals entered by said input means.

3. A color image processing apparatus comprising:

input means for entering a plurality of color component signals;

detecting means for detecting a background color of an image represented by said plurality of color component signals;

judging means for judging a color of a pixel represented by said plurality of color component signals in accordance with a predetermined judging standard; and control means for controlling the predetermined judging standard in accordance with the background color detected by said detecting means;

wherein said detecting means is adapted to detect the background color by preparing a histogram, based on the plurality of color component signals entered by said input means; and wherein said detecting means is adapted to detect peaks of said histogram as the background color.

4. A color image processing apparatus comprising:

input means for entering a plurality of color component signals;

detecting means for detecting a background color of an image represented by said plurality of color component signals;

judging means for judging a color of a pixel represented by said plurality of color component signals in accordance with a predetermined judging standard; and control means for controlling the predetermined judging standard in accordance with the background color detected by said detecting means;

wherein said control means is adapted to detect the predetermined judging standard according to one of a luminosity, saturation and hue of the background color.

5. A color image processing method comprising:

an input step of entering a plurality of color component signals;

a detecting step of detecting a background color of an image represented by said plurality of color component signals;

a judging step of judging the color of a pixel represented by said plurality of color component signals in accordance with a predetermined judging standard defined by a function comprised of a plurality of color parameters; and a control step of controlling the predetermined judging standard in accordance with the background color detected in said detecting step.

* * * * *

UNITED STATES PATENT AND TRADEMARK OFFICE
CERTIFICATE OF CORRECTION

PATENT NO. : 5,489,989

DATED : February 6, 1996

INVENTOR(S) : Hideaki Shimizu, et al.

It is certified that error appears in the above-indentified patent and that said Letters Patent is hereby corrected as shown below:

COLUMN 1:

Line 43, "Input" should read --input--.

COLUMN 3:

Line 37, "solenoid" should read --solenoids--; and
Line 38, "solenoid" should read --solenoids--.

COLUMN 10:

Line 39, "controller 2c" should read --controller 2a--.

COLUMN 11:

Line 41, "satisfies" should read --satisfy--; and
Line 50, "effecting" should read --effective--.

Signed and Sealed this

Twenty-fifth Day of June, 1996

Attest:

BRUCE LEHMAN

Attesting Officer    Commissioner of Patents and Trademarks